United States Patent [19] [11] 3,725,590
Verstegen [45] Apr. 3, 1973

[54] ARRANGEMENT FOR TDM TELECOMMUNICATION BETWEEN PCM SWITCHING NETWORKS

[75] Inventor: Willi Verstegen, Kornwestheim, Germany

[73] Assignee: International Standard Electric Corporation, New York, N.Y.

[22] Filed: Sept. 1, 1971

[21] Appl. No.: 176,834

[52] U.S. Cl. ..........................179/15 BS, 178/69.5 R
[51] Int. Cl. ..........................H04j
[58] Field of Search ......179/15 A, 15 BS; 178/69.5 R

[56] References Cited

UNITED STATES PATENTS

| | | | |
|---|---|---|---|
| 3,522,381 | 7/1970 | Feder | 179/15 A |
| 3,639,693 | 2/1972 | Bartlett | 179/15 BA |

*Primary Examiner*—Ralph D. Blakeslee
*Attorney*—C. Cornell Remsen, Jr. et al.

[57] ABSTRACT

A TDM switching system is disclosed which permits PCM transmission between exchanges. Both directions of transmission are regulated at the clock rate of one exchange. Using a particular form of control of one input stage, it is possible to eliminate the need for buffer storage formerly used to compensate for frequency and phase variations.

6 Claims, 7 Drawing Figures

INVENTOR
W. VERSTEGEN

BY D. D. Warner
ATTORNEY

ARRANGEMENT FOR TDM TELECOMMUNICATION BETWEEN PCM SWITCHING NETWORKS

The present invention relates to a control method and a circuit arrangement for telecommunication, particularly telephone switching networks with time-division multiplex switching of pulse-code-modulated signals in the exchanges and four-wire transmission of the pulse-code-modulated signals between neighboring exchanges.

The invention has for a primary object a reduction in the number of buffer and speech stores required in the input circuits of telephone exchanges. It has particular application in asynchronously operated integrated PCM telecommunication networks, and enables the solution of matching problems resulting from the differing control pulses of the exchanges involved or from delay variations.

The control method according to the invention is characterized in that each of the two directions of transmission of a PCM transmission path is operated with the through-switching frequency at the clock rate of one exchange, that one of the opposite input circuits of neighboring exchanges as a synchronous group is operated at the clock rate of its own exchange with respect to all read and write operations, that the respective other of the opposite input circuits as an asynchronous group, without any buffer stores being inserted, is operated at the clock rate of its own exchange with respect to the read and write operations of the exchange side and at the clock rate of the other exchange with respect to the transmission-path side, and that delay compensation between both directions of transmission is carried out, in known manner, in the synchronous group only.

A further feature of the control method according to the invention is characterized in that the pulse-code-modulated signals of both directions of transmission are buffered in the same row of a common speech store of the input circuit, that in each channel of the clock pulse of the exchange there is performed one read operation and one write operation of both directions of transmission with respect to different rows, and that the four read and write operations with respect to one row are performed within one frame.

A special feature of the control method according to the invention is characterized in that, at the time coincidence of the channels of a connection for performing the read and write operations with respect to one row of the speech store, the signals bypass the speech store on a direct path in one direction.

A further feature of the control method according to the invention is characterized in that each transmission of the PCM information from the parallel/serial converter over the outgoing multiplex highway is delayed by 1 or 2 bit times with respect to the reception from the incoming multiplex line, and that the transmission of the channels over the outgoing multiplex highway is also delayed by 1 or 2 bit times with respect to the reception of correspondent channels over the incoming multiplex highway.

A circuit arrangement for carrying out the control method according to the invention is characterized by two flip-flops interconnected via AND-gates, which flip-flops carry out the automatic control of the necessary cyclical read and write operations by combination of the channel pulses and bit pulses of the multiplex highways and of the fundamental-time pulses of the multiplex highways and the exchange.

A circuit arrangement for carrying out the delay compensation, which might be required in the control method according to the invention, is characterized by a chain of stepped delay lines which are individually bridgeable by binary counters via gates.

The invention will now be explained in conjunction with the accompanying drawings, in which.

Figure 1:
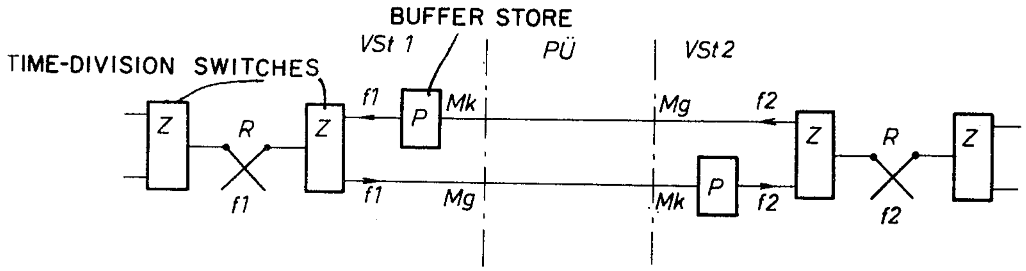
FIG. 1 is a block diagram of known devices for interconnecting two exchanges with time-division multiplex switching.

The block diagram of FIG. 1 shows known devices for connecting two exchanges VS*t*1, VS*t*2. In the example shown, the calls are switched through in both exchanges via a time switch Z, a space switch R and another time switch Z (hereinafter abbreviated: switch sequence ZRZ). Another known switch sequence is RZR. In the space switch R, the speech samples are selectively exchanged between two different spatial TDM highways, with through-switching in the exchanges being effected with a frequency *f*1 or *f*2, respectively. In the time switches Z, the speech samples are stored temporarily in the speech stores, so that connections can be established between not corresponding time channels and said connections can be completed, if necessary, in the space switch in a third deviating time channel. The two exchanges VS*t*1, VS*t*2 are interconnected via a four-wire PCM transmission path PU.

In the exchange VS*t*1, the channels are transmitted onto the outgoing multiplex highway M*g* with the frequency *f*1; correspondingly, the channels in the exchange VS*t*2 are transmitted onto the outgoing multiplex highway M*g* with the frequency *f*2 peculiar to said exchange.

In the networks with two or more exchanges, a distinction is made between synchronous operation, in which the clock generators determining the frequencies *f*1 and *f*2 are, for instance, phase locked, and asynchronous operation, in which the clock generators are not locked. With both modes of operation, in known connecting arrangements buffer stores P are inserted in both directions of transmission. They are necessary because the control of the switching network operates at the clock-pulse rate of the respective own exchange and, therefore, can process only those incoming speech samples which are in phase with said clock pulse. However, even if the network is operated synchronously, delay variations, too, result in variations in the phases of the incoming signals.

Figure 2:
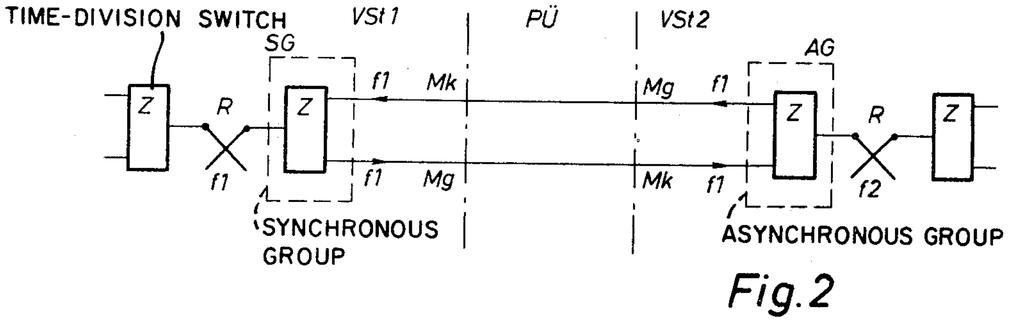
FIG. 2 is a block diagram of the inventive devices for interconnecting two exchanges with time-division multiplex switching.

In the solution according to the invention which is illustrated in FIG. 2 as a block diagram, a simplification is attained by a shift and combination of the operations. The exchanges VS*t*1 and VS*t*2 again have the switch sequence ZRZ and are interconnected via a PCM transmission path PU operated in the four-wire mode. However, both directions of transmission are operated by the clock generator of the exchange VS*t*1 with the frequency *f*1. This results in a synchronous group SG at the exchange VS*t*1 and in an asynchronous group AG at the exchange VS*t*2. For both directions, the function of both buffer stores P is transposed to the type of control of the asynchronous group AG. Delay compensation might be necessary in the synchronous group SG but not in the asynchronous group AG.

Figure 3:
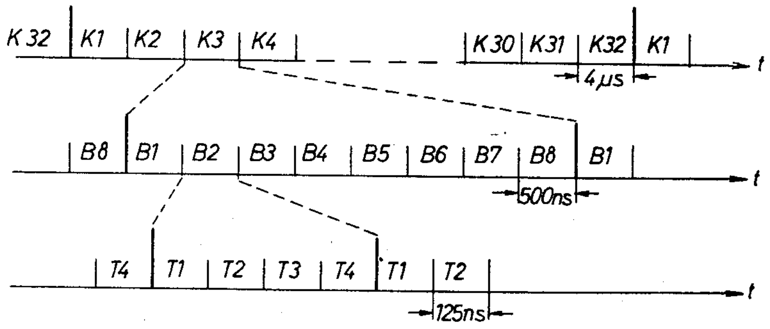
FIG. 3 is a timing diagram of the channels, bit times and fundamental times.

For a better understanding of the further description, FIG. 3 shows the designations hereinafter used for the timing. In the example, a frame of the time-division multiple is sub-divided into thirty-three channels K1 to K32. Each channel has a duration of e.g. 4 microseconds. In the example, a channel is divided into eight bit times B1 to B8, each having a duration of 500 ns. Finally, each bit time is divided into four fundamental times T1 to T4 of a duration of 125 ns. The time interval of the first fundamental time T1 of the second bit time B2 in the third channel K3 will hereinafter be referred to as time interval K3.B2.T1.

In the following it is assumed that the speech samples of both directions of transmission are temporarily stored in a jointly used speech store of the time switches of the ZRZ switching network, which speech store gives random access. Only one row is then required for both directions of transmission of a connection.

Figure 4:
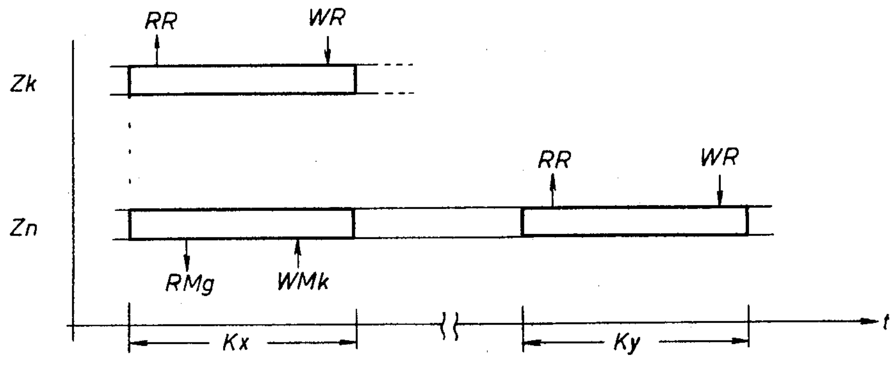
FIG. 4 is a timing diagram of the read and write operations at the speech store.

FIG. 4 serves to explain the read and write operations at the speech store. In each channel time, e.g. in the channel K*x*, two read and write operations are performed; it can also be generally said that each row of the speech store, e.g. the row Z*n*, is read twice and written twice in each frame.

In channel K*x*, a write operation RR is first performed during which the contents of the row ZK are transmitted to the space switch. Still in the same channel K*x*, a new speech sample of the opposite direction is written, in a write operation WR, from the space switch into the same row Z*k*. Also in channel K*x*, a read operation RMg is performed during which the contents of the row Z*n* are transmitted onto the outgoing multiplex highway. Finally, in the channel K*x*, a write operation WM*k* is performed during which a speech sample is written from the incoming multiplex highway into the row Z*n*.

In another channel K*y*, the contents of the row Z*n* are transmitted in a read operation RR to the space switch and a speech sample of the opposite direction is written, in a write operation WR, from the space switch into the row Z*n*. Also in channel K*y*, information is exchanged between some other row of the speech store and the PCM transmission path to the other exchange.

In the following, the above-mentioned read and write operations of the channel K*x* will be explained once again in conjunction with the block diagram of FIG. 5. It is assumed that both on the PCM transmission path and via the space switch, the speech samples are transmitted serially as PCM words while writing and reading of the speech store are effected in parallel form. To match these different forms of transmission, serial/parallel converters SP1, SP2 and SP3 are provided at the input of the speech store SM, and parallel/serial converters PS1, PS2 and PS3 are arranged at the output. In the paths with parallel through-switching, the electronic gates S1 to S8, represented by contact symbols, actually exist in corresponding multiples.

In the time slot of channel K*x*, a read operation RR is first performed during which the contents of the row Z*k* of the speech store SM are transmitted via gates S8 and S4 to the parallel/serial converter PS3. Independently thereof, this is followed by the serial transmission via the space switch R.

Then, in channel K*x*, a read operation RM*g* is performed during which the contents of the row Z*n* are written via the gates S8, S4 and S3 into the parallel/serial converter PS2, for example. At the same time, the PCM information written in the preceding channel K (x−1) into the parallel/serial converter PS1 is transmitted serially via the gate S6 and the outgoing multiplex highway M*g*.

In channel K*x*, this is followed by a write operation WMk during which the contents of the serial/parallel converter SP2 are written via the gates S1, S2 and S7 into the row Z*n* of the speech store SM. At the same time, the PCM information of the next channel K (x+1) is already entering, via the gate S5, the serial/parallel converter SP1.

Finally, at the end of the channel K*x*, a write operation WR is performed during which the contents of the serial/parallel converter SP3 are written via gates S2 and S7 into the row Zk of the speech store SM.

Thus, in the case of 32 channels with eight-digit PCM information, only one random-access speech store SM with 32×8 bits, three serial/parallel converters with 8 bits each, and three parallel/serial converters with 8 bits each are required.

The speech store SM is addressed at the clock rate of its exchange. With the designations explained in conjunction with FIG. 3, the read operation RR is performed in the time interval K*x*.B8.T4, while the read and write operations RM*g*, WM*k* may be carried out in the time intervals K*x*.T2 or K*x*.T3 of arbitrary bit times.

If, by way of exception, all four operations associated with one connection are performed in the same time channel of an exchange, only one direction of speech can, during a frame, be accommodated in the storage SM. The gates S7 and S8 make it possible for the opposite direction of speech to bypass the speech store SM on a direct path DW. The gates S7 and S8 change over to the direct path DW if, when a channel counter of the incoming multiplex highway Mk or the outgoing multiplex highway M*g* is compared with the row address of the time switch, correspondence is indicated. This comparison can be carried out in known manner.

If the clock pulse of the incoming multiplex highway Mk leads the clock pulse of the exchange, the half-connection from the incoming multiplex highway M*k* to the space switch R is switched through on the path SP1 or SP2 – S1 – S2 – S7–DW – S8 – S4 – PS3.

In this case, the gates S7 and S8 are changed over in the time interval K*x*.B1.T1.

If the clock pulse of the exchange leads the clock pulse of the outgoing multiplex highway M*g*, the half-connection from the space switch R to the outgoing multiplex highway Mg is switched through on the path SP3 – S2 – S7 – DW – S8 – S4 – S3 – PS1 or PS2.

In this case, the gates S7 and S8 are changed over in the time interval Kx.B8.T4.

If the clock pulse of the exchange corresponds to the clock pulse of the multiplex highway also with respect to the bit times, both half-connections may be switched through directly in the above-described manner.

Thus, in the control method according to the invention, the time switch of the asynchronous group performs the following functions:

1. Synchronization between the clock pulses of the multiplex highways associated with one another and the exchange.
2. Compensation for the phase differences.
3. Buffering the channels of both directions of speech in the speech store if the channel counter of the multiplex highway does not correspond, in a time slot, to the row address of the time switch.
4. Direct through-switching of the direction or opposite direction of speech if the channel counter corresponds to the row address of the time switch.

The time switch of the synchronous group performs the following functions;

1. Control of all read and write operations of the speech store at the clock rate of the respective own exchange.
2. Compensation for the pulse time delays occurring on the multiplex highways, in the asynchronous group and in the synchronous group.
3. Compensation for the long-term delay changes caused, among other things, by temperature variations.
4. Manual or automatic delay compensation after the switching-on of the multiplex highways.
5. Buffering the channels of both directions of speech in one and the same row of the speech store (necessary only with the switch sequency ZRZ) if the channel counter of the multiplex highway does not correspond, in a time slot, to the row address of the time switch.
6. Direct through-switching of the direction or opposite direction of speech if the channel counter corresponds to the row address of the time switch.

Figure 5:
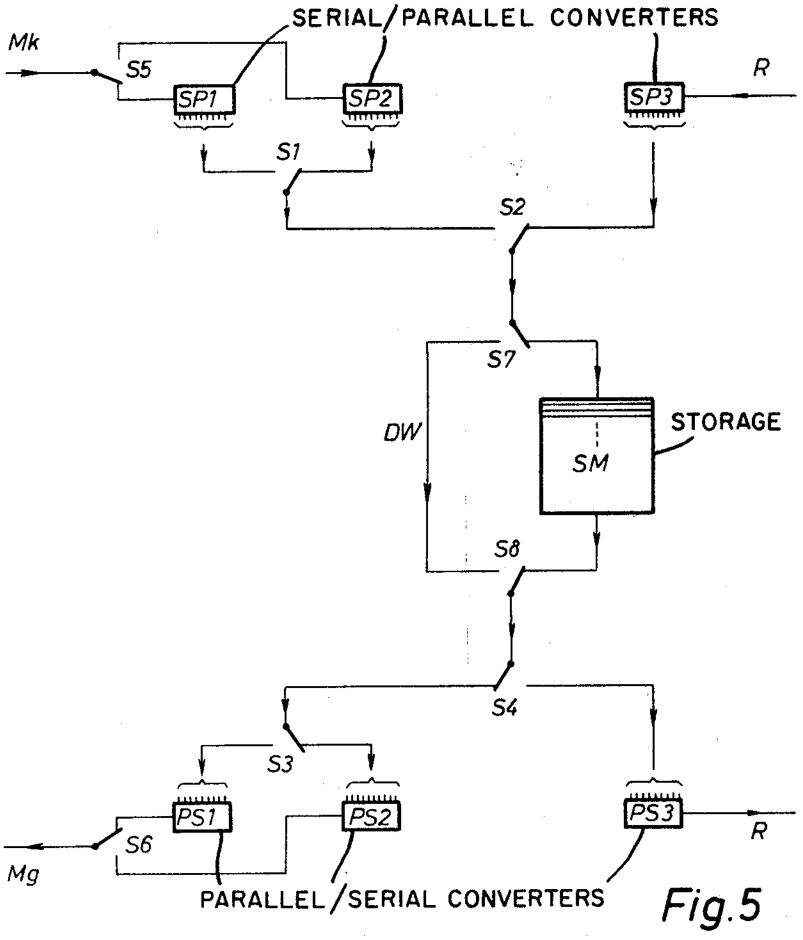
FIG. 5 is a block diagram of the peripheral equipment of a speech store.
Figure 6:
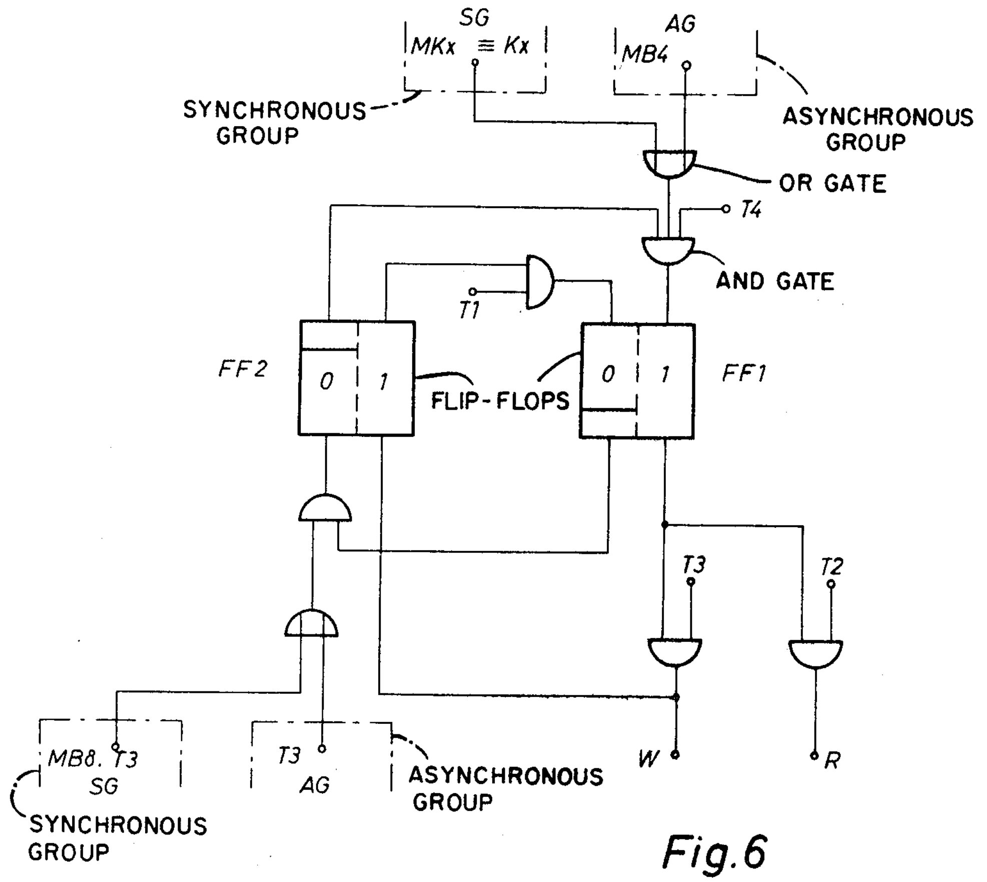
FIG. 6 shows a circuit arrangement for automatic control of the read and write operations of a speech store.

Following is a description, with reference to FIG. 6, of a circuit arrangement for synchronizing the read and write operations in the synchronous or asynchronous group:

The channels received from the incoming multiplex highway Mk, following the finding of the synchronizing combination (certain PCM word which is, for instance, in channel 1) and the corresponding setting of a channel counter individually associated with the multiplex highway, are successively written into the serial/parallel converters SP1 and SP2, respectively, as is shown in FIG. 5.

The overwriting of the row of the speech store determined by the channel counter is to be effected in the fundamental time T3 of a bit time while the read-out of the same row is to take place in the immediately preceding fundamental time so as to overwrite the respective parallel/serial converter PS1 or PS2. The overwriting of the row with the contents of the serial/parallel converter is to be effected in about the middle of the channel time of a channel of the multiplex highway Mk.

The circuit arrangement of FIG. 6 substantially consists of two flip-flops FF1 and FF2 and a number of AND and OR-gates, which connect the respective clock signals of the multiplex highway and the exchange so as to form the necessary read and write instructions.

During the bit time MB4 of a multiplex highway of an asynchronous group AG or if the channel counter MKx of a multiplex highway of a synchronous group SG corresponds to the channel pulse kx of the exchange, the flip-flop FF1 is set to 1 during the fundamental time T4 unless the flip-flop FF2 is in the 1-state. Then, in the fundamental times T2 and T3 of the next bit time, an instruction appears for the next read operation R or write operation W of a row of the speech store.

The 0-output of the flip-flop FF1 inhibits the 0-input of the flip-flop FF2. During the fundamental time T3, the flip-flop FF2 is simultaneously set to 1. Then, in the subsequent fundamental time T1, the flip-flop FF1 is reset to 0.

During the following fundamental time T3 of an asynchronous group AG or in a synchronous group SG during the fundamental time T3 of the bit time MB8, the flip-flop FF2 is set to 0. During the next fundamental time T4, if the conditions given at the beginning of the explanation of FIG. 6 are fulfilled, the flip-flop FF1 is reset to 1.

The circuit arrangement of FIG. 6 has the following advantages: After the voltage and the clock generators have been switched on, the circuit is automatically brought back to its initial position within a few bit times. For each read and write operation, a complete fundamental time is available.

The remarks made in connection with FIG. 5 also apply to the control of the speech store of an asynchronous group as long as the clock frequency of the multiplex highway is equal to or smaller than the clock frequency of the exchange belonging to the asynchronous group.

However, the method of direct through-switching fails to work in the above-described form if a channel of the multiplex highway completely falls within a channel of the exchange. This difficulty can be avoided if the transmission of the PCM information from the respective parallel/serial converter PS1 or PS2 over the outgoing multiplex highway Mg is delayed by 1 or 2 bit times with respect to the reception from the incoming multiplex highway Mk. This can be realized by providing that the gate S3 in each case changes over with a delay of 1 or 2 bit times compared to the gate S1, and that analogously thereto the transmission of the channels over the outgoing multiplex highway Mg is also delayed by 1 or 2 bit times with respect to the reception of correspondent channels over the incoming multiplex highway Mk.

Figure 7:
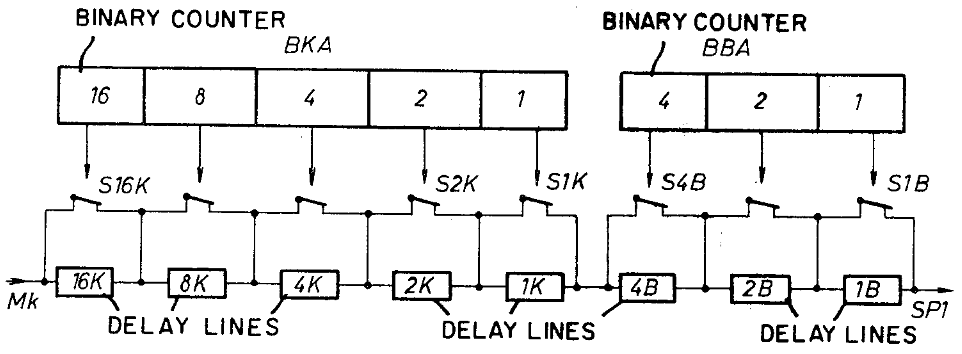
FIG. 7 shows a circuit arrangement for automatic delay compensation in a synchronous group.

FIG. 7 shows a circuit for the manual delay compensation in the synchronous group. However, it can also be utilized for the automatic compensation of the delay variations. Various causes are known which may lead to delay variations. The time delays are dependent on the length of the transmission path and may easily be of the order of the duration of some channels. The circuit of FIG. 7 has the following functions:

After the switching-on of the synchronous group, all delay lines 16K to 1B, for example, are short-circuited via the gates S16K to S1B symbolically illustrated as switches. After the finding of the synchronizing combination, the channel counter and the bit counter of the multiplex highway are set to zero. Then, the contents of the channel counter of the multiplex highway are compared with the contents of the channel counter of the exchange. If there is no correspondence, the binary counter BKA for channel compensation receives a pulse and inhibits the gate S1K. Thus, the delay line 1K with a delay of one channel is switched on. This is followed by another comparison of the channel counters in the next channel of the multiplex highway. If there is no correspondence, the binary counter BKA again receives a pulse. This pulse inhibits the gate S2K and enables the gate S1K. This is continued until, in a comparison between the channel counter of the multiplex highway and that of the exchange, correspondence is determined.

The combination of inhibited gates S1K to S16K then set by the binary counter BKA corresponds to the necessary delay compensation in units of the duration of one channel.

Fine adjustment with respect to the bit times is effected in corresponding manner with the aid of the delay lines 1B to 4B which are set by the binary counter BBA for bit compensation with the aid of the gates S1B to S4B.

Following the delay compensation, automatic control of the read and write operations with the aid of a circuit according to FIG. 6, which was explained above, takes place in the synchronous group, too.

What is claimed is:

1. A method of controlling telephone switching networks employing time-division multiplex switching of pulse-code modulated signals in telephone exchanges and four-wire transmission of the pulse-code-modulated signals between neighboring exchanges, comprising transmitting signals between first and second neighboring exchanges in each of the two directions of transmission of a PCM transmission path at the clock rate of the first exchange, operating the interconnected input circuits of the neighboring exchanges as synchronous groups at the clock rate of the first exchange, operating other circuits of the second exchange as asynchronous groups at the clock rate of the second exchange with respect to the read and write operations of the second exchange, and providing delay compensation for both directions of transmission between the exchanges in the first exchange only.

2. A method according to claim 1, in which the pulse-code modulated signals of both directions of transmission are buffered in the same row of a common speech store of the input circuit, that in each channel of the clock pulse of the exchange there is performed one read operation and one write operation of both directions of transmission with respect to different rows and that the four read and write operations with respect to one row are performed within one frame.

3. A control method according to claim 2, in which at the time coincidence of the channels of a connection for performing the read and write operations with respect to one row of the speech store, the signals bypass the speech store on a direct path in one direction.

4. A control method according to claim 3, in which each transmission of the PCM information from the parallel/serial converter over the outgoing multiplex highway is delayed by one or two bit times with respect to the reception from the incoming multiplex highway, and the transmission of the channels over the outgoing multiplex highway is also delayed by one or two bit times with respect to the reception of corresponding channels over the incoming multiplex highway.

5. A circuit arrangement for carrying out the control method according to claim 1, comprising two flip-flops inter-connected via AND-gates, which flip-flops carry out the automatic control of the necessary cyclical read and write operations by combination of the channel pulses and bit pulses of the multiplex highways and of the fundamental-time pulses of the multiplex highways and the exchange.

6. A circuit arrangement for carrying out the control method according to claim 1, comprising a chain of stepped delay lines which are individually bridgeable by binary counters via gates.

* * * * *